United States Patent Office 3,107,243
Patented Oct. 15, 1963

3,107,243
DIOXAZINE DYESTUFFS
André Pugin, Riehen, near Basel, and Guido Schetty, Basel, Switzerland, assignors to J. R. Geigy A.-G., Basel, Switzerland
No Drawing. Filed July 19, 1961, Ser. No. 125,095
Claims priority, application Switzerland July 20, 1960
4 Claims. (Cl. 260—246)

The present invention concerns new dyestuffs of the dioxazine series, processes for the production thereof, their use for the pigmenting of materials of all types and, as industrial product, the material dyed and pigmented therewith.

It has been found that remarkably strong and light-fast dioxazine dyestuffs are obtained if 2 mols of an aminophenyl ketone which in at least one o-position to the amino group is either unsubstituted or contains a hydroxy or ether group, are condensed with tetrahalogen-quinone, in particular with tetrachloroquinone, and the condensation product is converted under ring closing conditions into compounds of the general Formula I

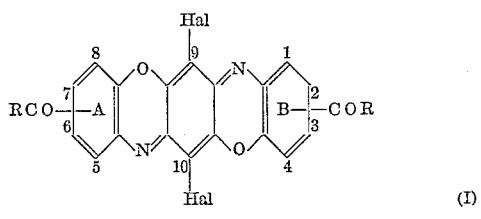

(I)

In this Formula I:

R represents a possibly further substituted, advantageously aromatic hydrocarbon radical, and
Hal represents halogen, preferably chlorine or bromine.

The external benzo radicals A and B can be further substituted and can also contain fused rings.

R is preferably an aromatic radical, principally a radical of the benzene series. Like the external benzoradicals A and B it can be further substituted, for example, by aliphatic groups, e.g. by methyl, ethyl, propyl, isopropyl, n-butyl, isobutyl, tert. butyl, amyl groups; by cycloaliphatic groups such as, e.g. cyclopentyl or cyclohexyl groups; by araliphatic groups such as, e.g. benzyl groups; by aromatic groups such as, e.g. phenyl groups; by ether groups; in particular by alkoxy groups such as, e.g. methoxy, ethoxy, propoxy, or butoxy groups; by halogens such as, e.g. fluorine, chlorine or bromine; by sulphonyl groups such as, e.g. methylsulphonyl, ethylsulphonyl, chloromethylsulphonyl, bromomethylsulphonyl or isopropylsulphonyl groups; by sulphonic acid amide groups, e.g., sulphonic acid-methylamide, - ethylamide, -β-hydroxyethylamide, -β-cyanoethylamide, -propylamide, -γ-methoxypropylamide, -β,γ-dihydroxypropylamide,- butylamide, -cyclohexylamide, -dimethylamide, -diethylamide, -di-β-hydroxyethylamide, -dipropylamide, -di-β,γ-dihydroxypropylamide, -piperidide or -morpholide groups; by nitro, carboxylic acid ester, carboxylic acid amide or nitrile groups; possibly also by groups which dissociate acid in water such as, e.g., sulphonic acid or carboxylic acid groups. Finally, like the benzo radicals A and B, R can also contain fused rings, e.g. a tetramethylene group linked to a neighbouring ring carbon atom. R also represents, however, an aliphatic or araliphatic radical, e.g. the methyl, chloromethyl, phenoxymethyl, ethyl or benzyl group; or a cycloaliphatic radical such as, e.g. the cyclohexyl group.

The following are given as examples of aminophenyl ketones which can be used according to the invention:

3-aminobenzophenone,
3-amino-4'-methylbenzophenone,
3-amino-3',4'-dimethylbenzophenone,
3-amino-3'-methyl-4'-methoxybenzophenone,
3-amino-4'-methoxybenzophenone,
3-amino-4-chlorobenzophenone,
3-amino-4,6-dichlorobenzophenone,
(3-aminophenyl)-α- or (3-aminophenyl)-β- naphthyl ketone,
3-amino-4-hydroxybenzophenone,
3-amino-4-methoxybenzophenone,
3-amino-4-ethoxybenzophenone,
3-amino-4-benzyloxybenzophenone,
3-amino-4-phenoxybenzophenone,
3-amino-4-methoxy-4'-methylbenzophenone,
3-amino-4-methoxy-2',5'-dimethylbenzophenone,
3-amino-4-methoxy-3',4'-dimethylbenzophenone,
3-amino-4-methoxy-4'-ethylbenzophenone,
3-amino-4-methoxy-4'-methoxybenzophenone,
3-amino-4-methoxy-4'-ethoxybenzophenone,
3-amino-4-methoxy-4'-cyclohexyloxybenzophenone,
3-amino-4-methoxy-4'-benzyloxybenzophenone,
3-amino-4-methoxy-4'-phenoxybenzophenone,
3-amino-4-methoxy-4'-chloro- or -4'-bromo- benzophenone,
3-amino-4-methoxy-3',4'-dichloro- or -3',4'-dibromo-benzophenone,
3-amino-4,4'-dimethoxy-3'-chlorobenzophenone,
3-amino-4-methoxy-3',4',5'-trimethylbenzophenone,
3-amino-4-methoxy-6-chlorobenzophenone,
3-amino-4,6-dimethoxybenzophenone,
3-amino-4-methoxy-4'-methylsulphonylbenzophenone,
3-amino-4-methoxy-3'-diethylsulphonamido-benzophenone,
3-amino-4-methoxy-4'-p-chlorobenzoylamino-benzophenone,
(3-amino-4-methoxyphenyl)-α- or -β-naphthyl ketone,
3-amino-4-methoxy-acetophenone,
(3-amino-4-methoxyphenyl)-benzyl ketone.

Those amino phenyl ketones usable according to the invention are preferred which, in at least one o-position to the amino group, contain an ether group, in particular a low alkoxy group, e.g. the methoxy or ethoxy group.

The condensation of the aminophenyl ketones used according to the invention with the tetrahalogen-quinone to form corresponding 2,5-bis-(carbacylphenyl-amino)-3,6-dihalogen-1,4-benzoquinone, is performed at room temperature or while heating, preferably in an inert organic solvent, e.g. in a low aliphatic monoalcohol, advantageously in ethanol or also in nitrated or halogenated aromatic hydrocarbons such as, e.g. nitrobenzene or 1,2-dichlorobenzene. It is often of advantage to add a mineral acid binding agent, e.g. an alkali metal salt of a low fattty acid, in particular sodium acetate, or of a carbonic acid such as, e.g. sodium or potassium carbonate, or an earth alkali oxide or hydroxide, mainly magnesium oxide, to the solvent.

The ring closing conditions under which the 2,5-bis-(carbacylphenyl-amino) - 3,6 - dihalogen - 1,4-benzoquinones are converted into the corresponding dioxazine dyestuffs of general Formula I are those usual for this purpose. For example, 3,6-dichloro-2,5-dianiloquinones are heated in a high boiling organic solvent such as dichlorobenzene, trichlorobenzene, naphthalene or chloronaphthalene, to about 130–200° C., preferably in the presence of an oxidising agent, e.g. a nitro compound, in particular in nitrobenzene. To accelerate the ring closure, advantageously acids or compounds which split off acids or which react acid are added to the reaction mixture, in particular sulphonic acid or carboxylic acid halides, e.g. benzoyl chloride or benzene or toluene sulphonic acid chloride. Instead of the carboxylic acid and sulphonic acid halides, also the halides of ortho-acids can be used as additives promoting the dioxazine ring formation. Examples of such are benzotrichloride or also metal chlorides such as aluminum chloride, ferric chloride or zinc chloride.

In some cases, the ring closure can be performed in concentrated inorganic oxygen acids also, e.g. sulphuric acid, oleum, chlorosulphonic acid or polyphosphoric acids. In these cases the ring is closed at elevated temperatures of, e.g. 50 to 200° C.

A simplification of the two-step production process consists in condensing the aminophenyl ketones with tetrahalogenquinone in a higher boiling, inert organic solvent, e.g. dichlorobenzene or nitrobenzene and, without isolating the bisarylaminoquinone intermediate product, subjecting the reaction mixture to oxazine ring-forming conditions. It is also possible to condense the aminophenyl ketone with tetrahalogen quinone and close the oxazine ring in one and the same solvent at a raised temperature.

The dioxazine dyestuffs according to the invention which contain no sulphonic acid and carboxylic acid groups generally almost completely crystallise even in the hot reaction mixture and the crystals are a very pure form. They are isolated by filtering off and further purified by washing the filter residue with organic solvents and aqueous acids or bases.

For use as pigment dyestuffs, the new dioxazine dyestuffs are advantageously converted into a finely distributed form. For this purpose, for example, they are dissolved in acids and precipitated in a finely distributed form by diluting the solutions with water. Examples of solvents are sulphuric acid, aliphatic or aromatic carboxylic acids or sulphonic acids. They can also be finely distributed however, by milling, advantageously in the presence of auxiliary milling agents such as inorganic or organic salts which can easily be removed afterwards with solvents and, possibly, in the presence of additional auxiliary milling agents such as organic solvents, acids or bases. Solid or liquid organic solvents can be used. For example, the pigment dyestuffs isolated from the reaction mixture and dried, are milled with dehydrated calcium chloride or with sodium sulphate or sodium chloride in the presence of aliphatic or aromatic, possibly chlorinated and/or nitrated hydrocarbons such as cyclohexane, benzene, toluene, naphthalene, mono-, di- or tri-chlorobenzene, tetrachloroethane or nitrobenzene, low aliphatic ketones such as, e.g. acetone or low aliphatic mono-alcohols, e.g. methanol, ethanol or methoxy or ethoxy ethanol. After milling, the auxiliary substances are removed, inorganic salts for example, by dissolving with water, and organic auxiliaries possibly by distillation or with steam.

In this way, finely dispersed, yellow-orange, red, red-brown and raisin coloured pigments of remarkable colour strength are obtained which, compared with the crude products, have a softer texture. They can be used for the pigmenting of varnishes, rubber, lacquers, e.g. annealing lacquers and synthetic substances such as, e.g. polyvinyl chloride. They are also very well suited for the production of colours for paper printing as well as for the dyeing of viscose or cellulose material in the mass. The yellow-orange, red, red-brown and raisin coloured prints or dyeings obtained therewith are distinguished by their purity of shade, their high colour strength and very good fastness to light. In addition they are stable to cross-lacquering and very stable to solvents, migration and heat.

The new dioxazine dyestuffs according to the invention which contain groups which dissociate acid in water, mainly sulphonic acid and/or carboxylic acid groups, can be used in textile dyeing or, when lacquered with earth alkali salts, as pigment dyestuffs.

A preferred class of dyestuffs according to the invention corresponds to the formula

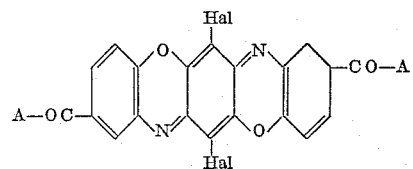

wherein:

A represents a member selected from the group consisting of aromatic radicals of the benzene and naphthalene series, and Hal represents a member selected from the group consisting of chlorine and bromine.

Particularly valuable in particular because of their shade are those compounds in which A represents an unsubstituted phenyl, an unsubstituted naphthyl and a substituted phenyl radical the substituents of which are selected from the group consisting of $CH_3$, $OCH_3$ and Cl.

Further details can be seen from the following examples. Where not otherwise expressly stated, parts are given as parts by weight. The temperatures are in degrees centigrade. The relationship of parts by weight to parts by volume is as that of grammes to cubic centimetres.

*Example 1*

22.7 parts of 3-amino-4-methoxybenzophenone (M.P. 99–100°), 13.5 parts of tetrachloroquinone and 2.2 parts of magnesium oxide in 250 parts of ethyl alcohol are refluxed for 2 hours. The grey-brown precipitate formed is filtered off hot, washed with alcohol and water and dried. 30.4 parts of a dianil compound are obtained which dissolve in cold sulphuric acid with an olive-grey colour. This intermediate product in 300 parts of notrobenzene is heated with 29.9 parts of benzoyl chloride for 12 hours at 180–185°. The precipitate which forms from the orange suspension is filtered off at 150°, washed with nitrobenzene, alcohol and acetone and dried. 20 parts of green crystals are so obtained, elementary analysis of which agrees with the formula of 2,6-dibenzoyl-9,10-dichlorotriphenenodioxazine. After cooling, a further 5 parts of red crystals are obtained from the mother lye.

The 2,6-dibenzoyl-9,10 - dichlorotriphenenodioxazine dissolves in concentrated sulphuric acid with a deep blue colour and, on precipitation with water, produces a red pigment. When milled with sodium chloride or calcium chloride in the presence of a slight amount of xylene or mineral oil, a blueish-red pigment is obtained from the green crystals after removal of the salt and the solvent. The pigment has a very high colour strength and very good fastness to light, heat and cross-lacquering.

A pigment having similarly good properties is obtained, if, in this example, 23.2 parts of tetrabromoquinone are used instead of tetrachloroquinone.

Example 2

10 parts of the dianil compound produced according to Example 1 from 3-amino-4-methoxybenzophenone and tetrachloroquinone are heated in 90 parts of concentrated sulphuric acid for 2 hours at 95° whereupon a deep blue solution is formed. After cooling, the sulphuric acid solution is poured into 800 parts of cold water. The red precipitate formed is filtered off, washed with water and dilute caustic soda lye and dried. 8.1 parts of a brown-red powder are obtained which are stirred in 20 parts of nitrobenzene for 1 hour at 150°. After filtering off and washing with ethyl alcohol, 5 parts of 2,6-dibenzoyl-9,10-dichlorotriphenodioxazine are obtained.

Example 3

58.34 parts of 3-amino-4'-chloro-4,4'-dimethoxybenzophenone (M.P. 139°), 24.6 parts of tetrachloroquinone and 4.03 parts of magnesium oxide in 600 parts of ethanol are refluxed for 3 hours. The precipitate formed is filtered off, washed with ethanol and water and dried. In this way 54 parts of a yellow-brown powder are obtained. This intermediate product is heated for 6 hours at 190° in 400 parts of nitrobenzene and 20 parts of benzoyl chloride. The orange-red suspension is filtered at 120° and the residue is washed with ethanol and acetone. In this way, 33 parts of 2,6-bis-(3'-chloro-4'-methoxybenzoyl)-9,10-dichloro-triphenodioxazine are obtained as red crystals withich have a greenish tinge. Milling with anhydrous calcium chloride in the presence of xylene produces a red pignment of very great colour strength and very pure shade which has good fastness to light, cross-lacquering and migration.

Example 4

25.7 parts of 3-amino-4,4'-dimethoxybenzophenone (M.P. 113°), 12.3 parts of tetrachloroquinone and 13.6 parts of crystallised sodium acetate in 200 parts of ethanol are refluxed for 4 hours. The precipitate formed is filtered off, washed with ethanol and water and dried. 28.1 parts of a grey-brown powder are obtained which dissolves in cold concentrated sulphuric acid with an olive colour. This intermediate product is heated in 150 parts of nitrobenzene with 40 parts of benzoyl chloride for 24 hours at 175–180°. The orange suspension is filtered at 120° and the filter residue is washed with ethanol and acetone. 20.3 parts of 2,6-bis-(4'-methoxybenzoyl)-9,10-dichlorotriphenodioxazine are so obtained in the form of a red powder. The powder dissolves in concentrated sulphuric acid with a deep blue colour. On milling with anhydrous calcium chloride, an orange pigment of very good colour strength is obtained which has good fastness to light, cross-lacquering and migration and also very good fastness to heat.

Orange pigments of similarly good fastness are also obtained if, in this example, instead of 3-amino-4,4'-dimethoxybenzophenone, 26.5 parts of 3-amino-4-methoxy-4'-chlorobenzophenone (M.P. 142°) or 24.1 parts of 3-amino-4-methoxy - 4' - methylbenzophenone (M.P. 110°) or 25.5 parts of 3-amino-4-methoxy-2',5-dimethylbenzophenone (M.P. 84–85°) are used.

All these pigments dissolve in hot dimethyl formamide or o-dichlorobenzene with a yellow-orange colour and in concentrated sulphuric acid with a deep blue colour.

If, in this example, instead of tetrachloroquinone, 21.2 parts of tetrabromoquinone are used, then pigments having similarly good properties are obtained.

Example 5

29.6 parts of 3-amino-4-methoxy-3',4'-dichlorobonzophenone (M.P. 142°), 13.5 parts of tetrachloroquinone and 2.2 parts of magnesium oxide in 300 parts of ethanol are refluxed for 2 hours. Brown crystals are formed which are filtered off under suction and washed with ethanol and water. This intermediate product is dried and heated in 200 parts of nitrobenzene in the presence of 30 parts of benzoyl chloride for 16 hours at 180–185°. The orange suspension formed is filtered at 100° and the filter residue is washed with ethanol, water and acetone. After drying, 22.3 parts of 2,6-bis-(3',4'-dichlorobenzoyl)-9,10-dichlorotriphenodioxazine are obtained as red crystals which have a green tinge.

On milling these crystals with anhydrous calcium chloride, a microcrystalline red pigment of great colour strength is obtained. It is of very pure shade and has very good fastness to light, solvents, cross-lacquering and migration and is also very stable to heat.

A red pigment having similarly good properties is obtained if, in this example, the 3-amino-4-methoxy-3',4'-dichlorobenzophenone is replaced by 25.5 parts of 3-amino-4-methoxy-3',4'-dimethylbenzophenone (M.P. 96°).

Example 6

22.2 parts of 3-amino-4-methoxyphenyl-naphthyl-(1')-ketone (M.P. 102°), 9.8 parts of tetrachloroquinone and 1.6 parts of magnesium oxide in 400 parts of ethanol are refluxed for 4½ hours. The precipitate formed is filtered off, washed with ethanol and water and dried. 23.2 parts of violet crystals are obtained. This intermediate product is heated for 5 hours at 180–185° in 180 parts of nitrobenzene and 9 parts of benzoyl chloride. The suspension is filtered hot and the residue is washed with alcohol and acetone. 8 parts of brown-red platelets are isolated in this way. On milling with anhydrous calcium chloride and a little quinoline, a red pigment of very great colour strength is obtained which has good fastness to light and cross-lacquering.

A pigment having similarly good properties is obtained if, in this example, 24.6 parts of 3-amino-4-methoxyphenyl-4'-methoxynaphthyl-(1')-ketone is used as starting material.

A pigment having similarly good properties is also obtained if, in this example, 13.4 parts of tetrabromoquinone are used instead of tetrachloroquinone.

Example 7

30.3 parts of 3-amino-4-benzyloxybenzophenone, 12.3 parts of tetrachloroquinone and 2 parts of magnesium oxide in 300 parts of ethanol are refluxed for 6 hours. The brown precipitate is filtered off, washed with ethanol and water and dried. The brown condensation product is heated in 200 parts of nitrobenzene with 25 parts of benzoyl chloride for 24 hours at 180–185°. The precipitate is filtered off at 100°, washed with ethanol and with acetone and dried. Yield: 20 parts of a product, elementary analysis of which agrees with the formula for 2,6-dibenzoyl-9,10-dichlorotriphenodioxazine.

The same product is obtained if, in this example, the 3-amino-4-benzyloxybenzophenone, is replaced by 24.1 parts of 3-amino-4-ethoxybenzophenone or by 28.9 parts of 3-amino-4-phenoxybenzophenone.

Example 8

2 parts of the pigment produced according to Example 1 from 3-amino-4-methoxybenzophenone and milling with salt, 36 parts of aluminium hydroxide, 60 parts of linseed oil varnish of medium viscosity and 0.2 part of cobalt linoleate are mixed together and milled on a set of three hot rollers. A colour for graphic purposes is obtained which produces blueish-red prints of particular purity and colour strength. The prints have also very good fastness to light.

Example 9

2 parts of the pigment produced according to Example 4 from 3-amino-4,4'-dimethoxybenzophenone, 10 parts of titanium dioxide, 35 parts of a 60% solution of a modified urea-alkyl resin in xylene/butanol 1:1, 10 parts of terpentine oil and 5 parts of xylene are ground for 48 hours in a ball mill. If this coloured lacquer is poured onto aluminium foils and fixed by stoving for 1 hour at 120°, pure orange colourings are obtained which have excellent fastness to heat, cross-lacquering and light.

*Example 10*

67 parts of polyvinyl chloride, 33 parts of dioctyl phthalate, 2 parts of dibutyl tin dilaurate, 0.6 part of the pigment produced according to Example 5 from 3-amino-4-methoxy-3',4'-dimethylbenzophenone, and 2 parts of titanium dioxide are mixed together and put through a set of hot rollers for 10–15 minutes at 140°. Red polyvinyl chloride foils are obtained which have very good fastness to migration and light.

What we claim is:
1. A compound of the formula

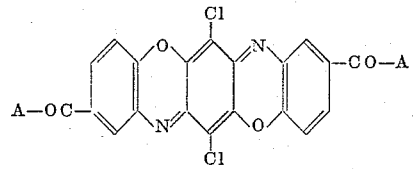

wherein A is a substituted phenyl, the substituents of which are selected from the group consisting of $CH_3$, $OCH_3$ and Cl.

2. The dioxazine dyestuff of the formula

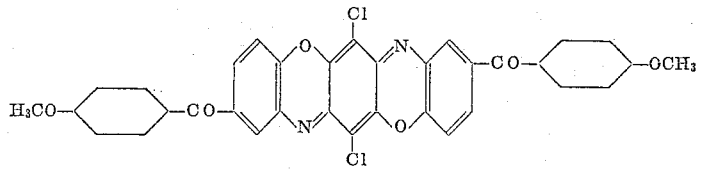

3. The dioxazine dyestuff of the formula

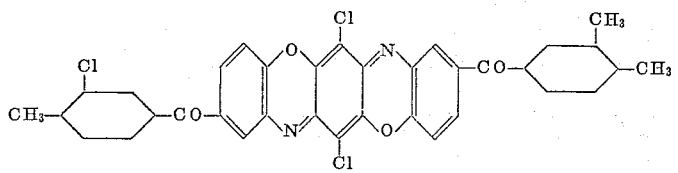

4. The dioxazine dyestuff of the formula

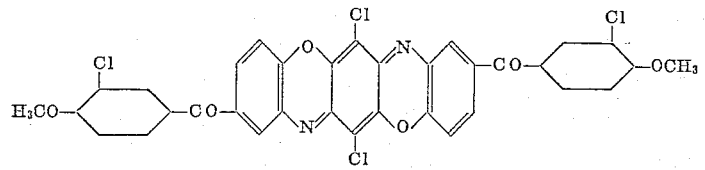

References Cited in the file of this patent
UNITED STATES PATENTS

| | | |
|---|---|---|
| 2,504,153 | Robbins | Apr. 18, 1950 |
| 2,948,721 | Frey | Aug. 9, 1960 |
| 3,022,298 | Mory et al. | Feb. 20, 1962 |

OTHER REFERENCES

Fieser et al.: "Organic Chemistry," 3rd ed., p. 883, Reinhold (1956).